United States Patent [19]
Miyakawa

[11] Patent Number: 5,712,935
[45] Date of Patent: Jan. 27, 1998

[54] OPTICAL SWITCH

[75] Inventor: Tosiya Miyakawa, Tokyo, Japan

[73] Assignee: NEC Corporation, Japan

[21] Appl. No.: 716,638

[22] Filed: Sep. 13, 1996

[30]  Foreign Application Priority Data

Sep. 18, 1995 [JP] Japan ................................ 7-238024

[51] Int. Cl.⁶ .................................................. G02B 6/26
[52] U.S. Cl. ........................... 385/22; 385/8; 385/9; 385/40; 385/41
[58] Field of Search ................................ 385/2, 3, 8, 9, 385/10, 16, 22, 40, 41

[56]  References Cited

U.S. PATENT DOCUMENTS

| 4,607,909 | 8/1986 | Sanford | 385/8 |
| 5,148,505 | 9/1992 | Yanagawa et al. | 385/22 |
| 5,481,636 | 1/1996 | Fukuda et al. | 385/8 |

OTHER PUBLICATIONS

"Integrated Optics 4×4 Switch Matrix With Digital Optical Switches", Electronics Letters, Jan. 4, 1990, vol. 26, No. 1, pp. 4–5.

"Low Drive Voltage Y–Branch Digital Optical Switch", Electronics Letters, Jan. 3, 1991, vol. 27, No. 1, pp. 24–26.

*Primary Examiner*—John Ngo
*Attorney, Agent, or Firm*—Ostrolenk, Faber, Gerb & Soffen, LLP

[57]  ABSTRACT

An optical switch includes a substrate, an optical waveguide, arm waveguides, S-shaped curved waveguides, and two pairs of control electrodes. The substrate has an electro-optic effect. The optical waveguide is formed on the substrate and on which light is incident. The arm waveguides are formed on the substrate and branched from the light-incident optical waveguide into a Y shape. The S-shaped curved waveguides are formed on the substrate and continuous to the arm waveguides to form S-shaped curves. The first pair of control electrodes are formed on the arm waveguides and S-shaped curved waveguides. The second pair of control electrodes are formed on the substrate to be close to the first pair of control electrodes at predetermined gaps thereto.

7 Claims, 3 Drawing Sheets

OPTICAL SWITCH

BACKGROUND OF THE INVENTION

The present invention relates to a waveguide type switch and, more particularly, to a branch type optical switch.

In optical communications, an optical switch using a Ti-diffused $LiNbO_3$ waveguide is expected to serve as a key device in, e.g., an optical switching device or an optical cross connector. In particular, a digital optical switch utilizing a change in optical field profile has excellent characteristics in that it can achieve a polarization-independent operation, high reliability, and moderation in fabrication tolerance by providing a margin to the operating voltage.

Conventionally, an optical switch of this type is constituted by a Y-branch waveguide and control electrodes as described in, e.g., "INTEGRATED OPTICS 4×4 SWITCH MATRIX WITH DIGITAL OPTICAL SWITCHES" in ELECTRONICS LETTERS Vol. 26, No. 1, pp. 4–5, Jan. 1990 and "LOW DRIVE VOLTAGE Y-BRANCH DIGITAL OPTICAL SWITCH" in ELECTRONICS LETTERS Vol. 27, No. 1, pp. 24–26, January 1991, and realizes performance at the operating voltage of ±35 to 60 V and an extinction ratio of about 15 dB.

FIGS. 2A and 2B show the structure of a conventional digital optical switch. In FIG. 2A, Ti is diffused on a Z-cut $LiNbO_3$ substrate 21 to form a single-mode optical waveguide 22. The optical waveguide 22 is branched into two arm waveguides 24 and 25 at a Y branch 23 having a branching angle θ, and the waveguide distance is increased by S-shaped curved waveguides 26 and 27 obtained by connecting two arcs in opposite directions to the arm waveguides 24 and 25.

As shown in FIG. 2B, four control electrodes 210 to 213 are formed on the substrate 21 through a buffer layer 28 comprising an $SiO_2$ film. The control electrodes 210 and 211 are respectively arranged immediately above the arm waveguides 24 and 25, and the control electrodes 212 and 213 are respectively arranged outside the control electrodes 210 and 211 at a gap of 5 to 10 µm. The control electrodes 210 and 212, and 211 and 213 are electrically connected to each other, and voltages having the same absolute values and different signs are applied by a drive circuit 29 to the control electrodes 210 and 211 upon a switching operation.

When a positive voltage is applied to the control electrode 210 and a negative voltage is applied to the control electrode 211, the refractive index of the arm waveguide 24 increases and inversely the refractive index of the arm waveguide 25 decreases, due to the electro-optic effect in which the refractive index of the medium changes in accordance with the electric field. Thus, the field profile of light which has been incident on the optical waveguide 22 and reached the Y branch 23 is gradually concentrated on the arm waveguide 24 having a high refractive index. Accordingly, when the voltage difference between the control electrodes 210 and 211 is large and the refractive index difference between the arm waveguides 24 and 25 is sufficiently large, most waveguide light passes through the arm waveguide 24 and emerges from the S-shaped curved waveguide 26. Inversely, when a negative voltage is applied to the control electrode 210 and a positive voltage is applied to the control electrode 211, the waveguide light passes through the arm waveguide 25 and emerges from the S-shaped curved waveguide 27, and waveguide light passing through the arm waveguide 24 and emerging from the S-shaped curved waveguide 26 is decreased.

In the conventional digital optical switch described above, switching is performed by using a change in optical field profile caused by the refractive index difference between the arm waveguides 24 and 25 in the waveguide region where Y-branching occurs with a branching angle θ. If the branching angle θ of the digital optical switch is excessively large, the waveguide distance between the terminal ends of the arm waveguides 24 and 25 becomes excessively large, so a change in optical field profile does not substantially occur, thereby increasing the operating voltage. For this reason, the smaller the branching angle θ, the better.

When, however, the branching angle θ is decreased, the distance between the terminal ends of the arm waveguides 24 and 25 is also decreased. When, e.g., branching angle θ=2 mrad. and arm waveguide length (electrode length)=5 mm, the distance between the terminal ends of the arm waveguides 24 and 25 becomes 10 µm. In this manner, when the distance between the arm waveguides 24 and 25 is small, optical coupling occurs also between the S-shaped curved waveguides 26 and 27 respectively continuous to the arm waveguides 24 and 25, thereby degrading the crosstalk characteristics of the optical switch.

SUMMARY OF THE INVENTION

It is an object of the present invention to provide an optical switch in which the crosstalk characteristics are improved without increasing the operating voltage.

In order to achieve the above object, according to the present invention, there is provided an optical switch comprising a substrate having an electro-optic effect, a first optical waveguide formed on the substrate and on which light is incident, second optical waveguides formed on the substrate and branched from the light-incident optical waveguide into a Y shape, third optical waveguides formed on the substrate and continuous to the second optical waveguides to form S-shaped curves, a pair of first control electrodes formed on the second and third optical waveguides, and a pair of second control electrodes formed on the substrate to be close to the first control electrodes at predetermined gaps thereto.

DESCRIPTION OF THE PREFERRED EMBODIMENT

The preferred embodiment of the present invention will be described with reference to the accompanying drawings.

Figure 1A:
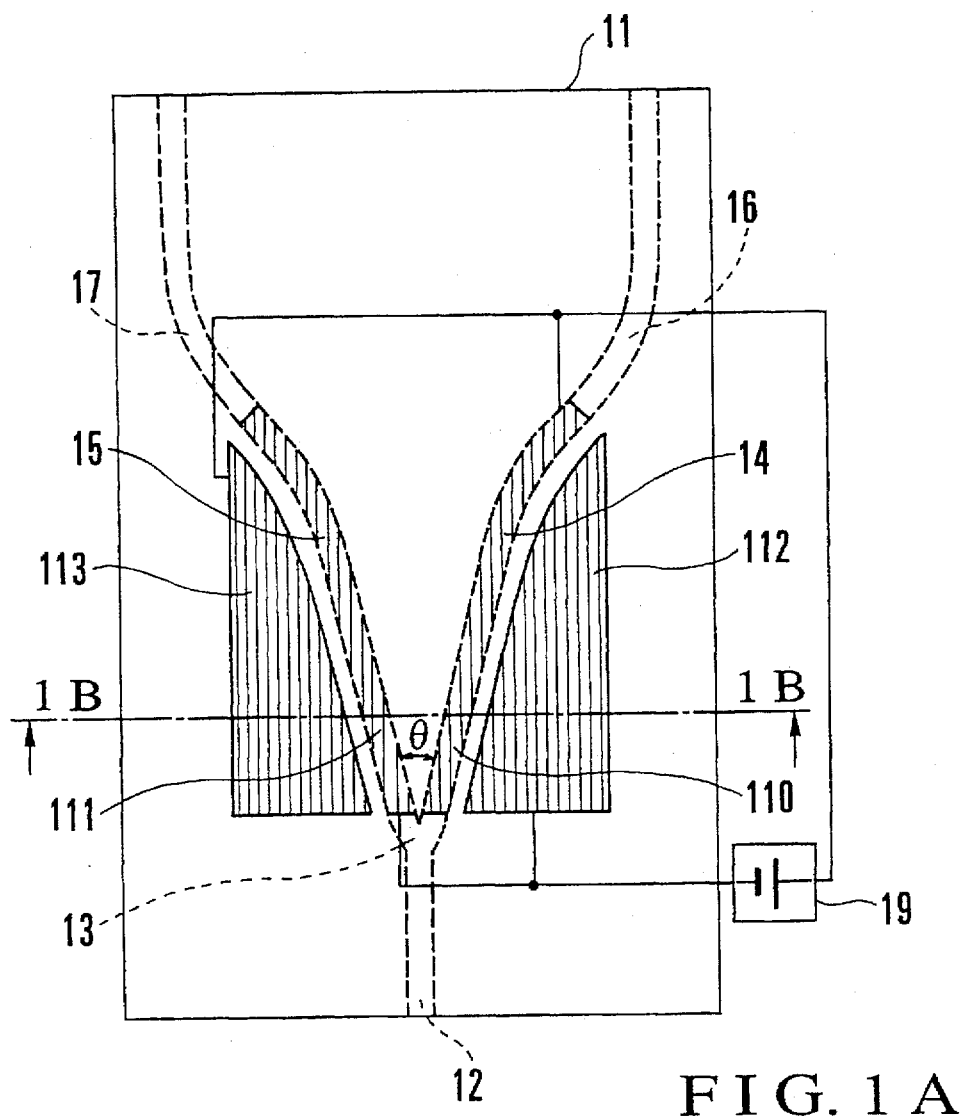
FIG. 1A is a plan view showing an optical switch according to an embodiment of the present invention.
Figure 1B:
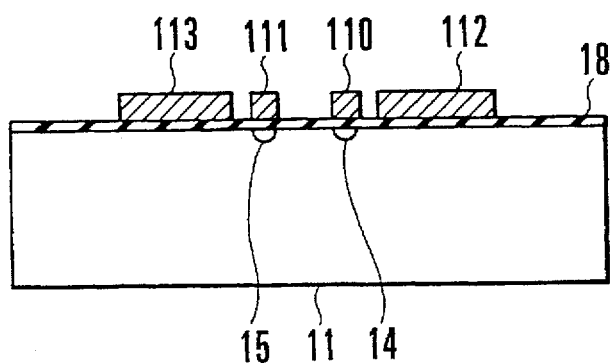
FIG. 1B is a sectional view taken along the line A–A' of the optical switch shown in FIG. 1A.
Figure 2A:
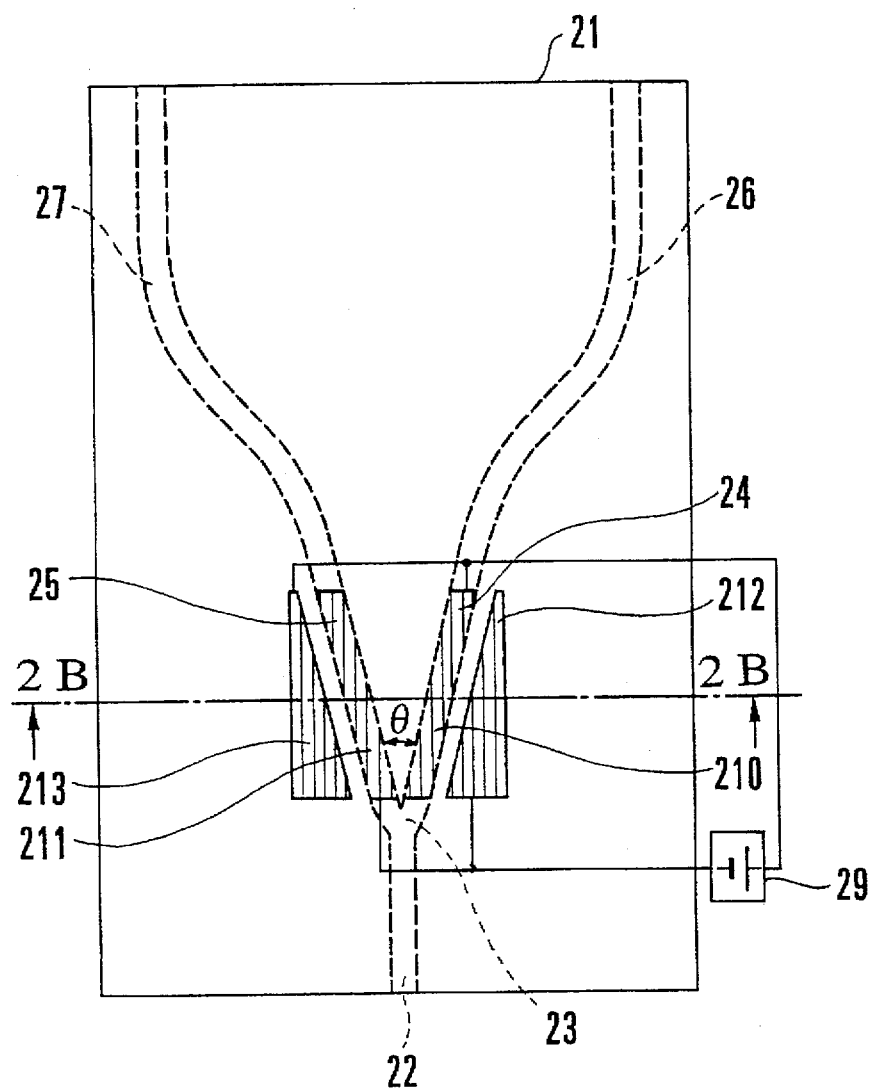
FIG. 2A is a plan view showing a conventional optical switch.

FIGS. 1A and 1B show an optical switch according to an embodiment of the present invention. In FIG. 2A, Ti is diffused on a Z-cut $LiNbO_3$ substrate 11 to form a low-loss single-mode optical waveguide 12. The optical waveguide 12 is branched into two arm waveguides 14 and 15 at a Y branch 13 having a branching angle θ, and the waveguide distance is increased by S-shaped curved waveguides 16 and 17 obtained by connecting two arcs in opposite directions to the arm waveguides 14 and 15.

Figure 2B:
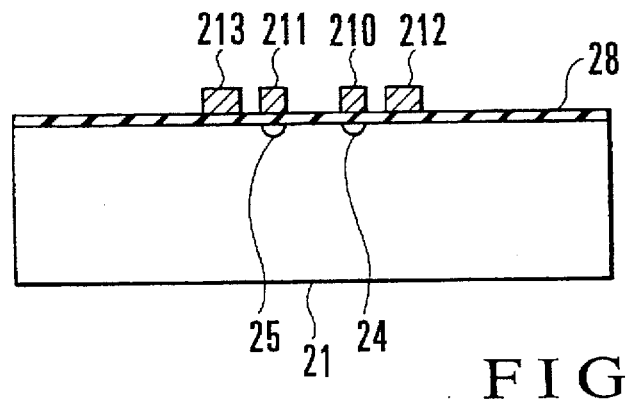
FIG. 2B is a sectional view taken along the line A–A' of the optical switch shown in FIG. 2A.

As shown in FIG. 2B, four control electrodes 110 to 113 are formed on the substrate 11 through a buffer layer 18 comprising an SiO$_2$ film. Of the control electrodes 110 to 113, the control electrode 110 is formed above the arm waveguide 14 immediately after branching to extend immediately above the front half of the S-shaped curved waveguide 16 continuous to the arm waveguide 14, and the control electrode 111 is formed above the arm waveguide 15 immediately after branching to extend immediately above the front half of the S-shaped curved waveguide 17 continuous to the arm waveguide 15. The control electrodes 112 and 113 are respectively arranged outside the control electrodes 110 and 111 at a gap of 5 to 10 µm. More specifically, the control electrodes 112 and 113 are also formed to extend along the front halves of the S-shaped curved waveguides 16 and 17, respectively. The control electrodes 110 and 112, and 111 and 113 are electrically connected to each other, and voltages having the same absolute values and different signs are applied from a drive circuit 19 to the control electrodes 110 and 111.

When a positive voltage is applied to the control electrode 110 and a negative voltage is applied to the control electrode 111, due to the electro-optic effect, the refractive index of the arm waveguide 14 and S-shaped curved waveguide 16 increase, and inversely the refractive index of the arm waveguide 15 and S-shaped curved waveguide 17 decreases. Thus, the field profile of light which has been incident on the optical waveguide 12 and reached the Y branch 13 is gradually concentrated on the side of the arm waveguide 14 and S-shaped curved waveguide 16 having a high refractive index. Accordingly, the waveguide light passes through the arm waveguide 14 and emerges from the S-shaped curved waveguide 16, and waveguide light passing through the arm waveguide 14 and emerging from the S-shaped curved waveguide 17 is decreased. Inversely, when a negative voltage is applied to the control electrode 110 and a positive voltage is applied to the control electrode 111, the waveguide light passes through the arm waveguide 15 and emerges from the S-shaped curved waveguide 17, and light passing through from the arm waveguide 14 and emerging from the S-shaped curved waveguide 16 is decreased.

In this manner, in this embodiment, since the control electrodes 110 and 112 are extended to the S-shaped curved waveguide 16 portion continuous to the arm waveguide 14 and the control electrodes 111 and 113 are extended to the S-shaped curved waveguide 17 portion continuous to the arm waveguide 15, the S-shaped curved waveguides 16 and 17 are also imparted with the refractive index difference by the control electrodes 110 to 113, thereby suppressing optical coupling between the S-shaped curved waveguides 16 and 17.

Figure 3:
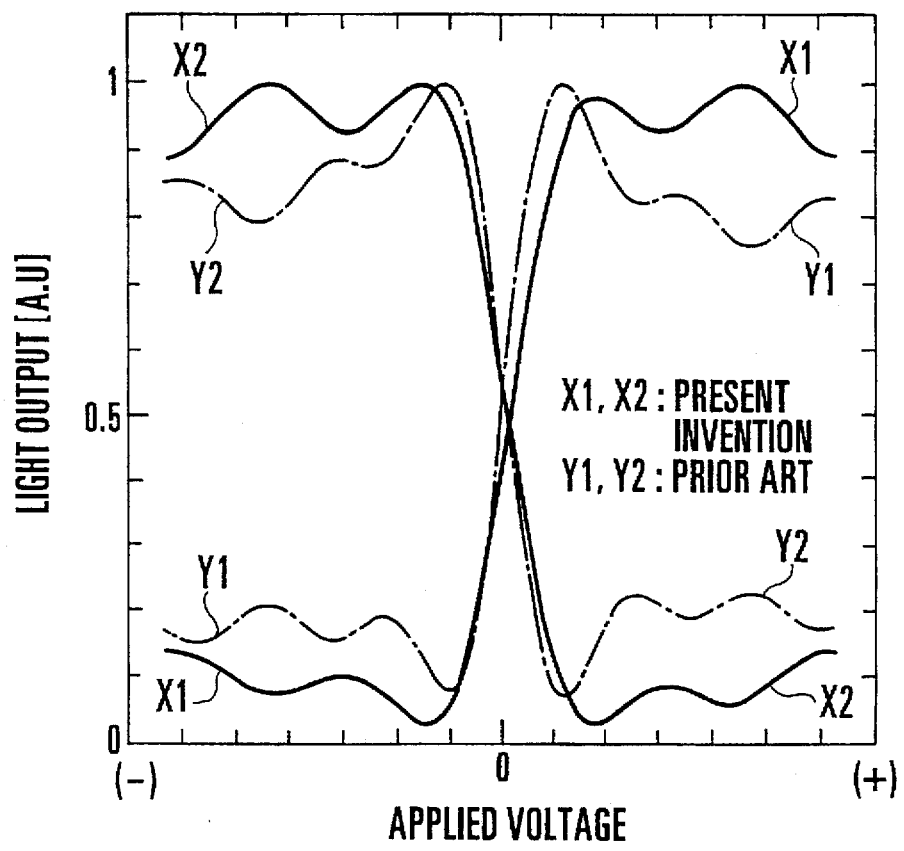
FIG. 3 is a graph showing the light output as a function of the operating voltage of the optical switch according to the present invention and that of the conventional optical switch.

As a result, even when the branching angle θ of the Y branch 13 is small, degradation in crosstalk characteristics of the optical switch can be prevented. FIG. 3 shows the light output as a function of the operating voltage of the optical switch according to the present invention in which branching angle θ=2.5 mrad. and electrode length=5 mm, and that of the conventional optical switch. As shown in FIG. 3, when a positive voltage is applied to the control electrode 110, a light output X1 of the waveguides 14 and 16 is larger than a light output Y1 of the conventional waveguides 24 and 26, and a light output X2 of the waveguides 15 and 17 is smaller than a light output Y2 of the conventional waveguides 25 and 27. When a negative voltage is applied to the control electrode 110 upon a switching operation, the light output X2 of the waveguides 15 and 17 is larger than the light output Y2 of the conventional waveguides 25 and 27, and the light output X1 of the waveguides 14 and 16 is smaller than the light output Y1 of the conventional waveguides 24 and 26. This indicates that the crosstalk characteristics between the arm waveguides 14 and 16, and 15 and 17 is improved greatly.

As has been described above, in the digital optical switch according to the present invention, since the control electrodes are extended to the S-shaped curved waveguide portions, optical coupling between the S-shaped curved waveguides can be suppressed to obtain good crosstalk characteristics. As the branching angle of the Y-branch can be decreased, the operating voltage can be decreased.

What is claimed is:

1. An optical switch comprising:

a substrate having an electro-optic effect, a first optical waveguide formed on said substrate and on which light is incident, second optical waveguides formed on said substrate and branched from said light-incident optical waveguide into a Y shape, third optical waveguides formed on said substrate and continuous to said second optical waveguides to form S-shaped curves, a pair of first control electrodes formed on said second waveguides and parts of said third optical waveguides continuous to said second optical waveguides, and a pair of second control electrodes formed on said substrate to be close to said first control electrodes at predetermined gaps thereto.

2. A switch according to claim 1, wherein said first control electrodes are formed above said second optical waveguides immediately after branching to extend immediately above front halves of said third optical waveguides.

3. A switch according to claim 1, wherein said second control electrodes are formed outside said first control electrodes to extend to said third optical waveguides.

4. A switch according to claim 1, wherein one of said first control electrodes and one of said second control electrodes that are not close to each other are electrically connected to each other.

5. A switch according to claim 1, wherein said first control electrodes are applied with voltages having the same absolute values and different signs.

6. A switch according to claim 1, wherein said third optical waveguides are arranged by oppositely orienting the curves to each other so that the gap is sharply spread.

7. An optical switch comprising:

a substrate having an electro-optic effect, a first optical waveguide formed on said substrate and on which light is incident, second optical waveguides formed on said substrate and branched from said light-incident optical waveguide into a Y shape, third optical waveguides formed on said substrate and continuous to said second optical waveguides to form S-shaped curves, a pair of first control electrodes formed on said second and third optical waveguides, and a pair of second control electrodes formed on said substrate to be close to said first control electrodes at predetermined gaps thereto;

wherein said first and second control electrodes are spaced apart by a gap of 5 to 10 µm, said second optical waveguides have a branching angle Θ of 2.5 mrad., and said control electrodes have an electrode length of 5 mm.

* * * * *